(12) United States Patent
O'Donnell et al.

(10) Patent No.: US 7,325,575 B1
(45) Date of Patent: *Feb. 5, 2008

(54) ROPE AND WEBBING PROTECTOR

(75) Inventors: Mark G. O'Donnell, Burlington, VT (US); Miles C. O'Donnell, Andover, MA (US)

(73) Assignee: Trach-Mate Incorporated, Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/913,593

(22) Filed: Aug. 6, 2004

Related U.S. Application Data (63) Continuation-in-part of application No. 10/800,796, filed on Mar. 15, 2004.

(51) Int. Cl.
*F16L 57/00* (2006.01)

(52) U.S. Cl. ............... 138/110; 138/151; 138/156; 138/178; 428/35.1; 428/36.9

(58) Field of Classification Search ............. 138/110, 138/170, 151, 156, 178, 123; 428/35.1, 36.1, 428/36.9
See application file for complete search history.

(56) References Cited

U.S. PATENT DOCUMENTS

| | | | | |
|---|---|---|---|---|
| 1,435,311 A | 11/1922 | Knight | ............ | 138/110 |
| 3,762,982 A | 10/1973 | Whittington | ............ | 138/110 X |
| 3,814,835 A | 6/1974 | Merry | ............ | 174/702 |
| 3,924,661 A | 12/1975 | Bornhoffer | ............ | 138/110 |
| 4,007,702 A | 2/1977 | Cave et al. | ............ | 114/230.2 |
| 4,231,208 A | 11/1980 | Willox | ............ | 52/741.3 |
| 4,402,489 A * | 9/1983 | Murray | ............ | 254/389 |
| 4,738,883 A | 4/1988 | Young | ............ | 428/34.9 |
| 4,802,509 A | 2/1989 | Brandolf | ............ | 138/110 |
| 4,929,478 A | 5/1990 | Conaghan et al. | ............ | 138/103 |
| 4,930,543 A | 6/1990 | Zuiches | ............ | 138/110 |
| 4,946,722 A | 8/1990 | Moyer | ............ | 428/36.1 |
| 4,981,196 A | 1/1991 | Palm | ............ | 182/112 |
| 4,985,942 A | 1/1991 | Shaw | ............ | 138/110 X |
| 5,411,777 A | 5/1995 | Steele et al. | ............ | 138/104 X |
| 5,413,149 A | 5/1995 | Ford et al. | ............ | 138/123 |
| 5,535,787 A | 7/1996 | Howell | ............ | 138/167 |
| 5,605,035 A | 2/1997 | Pethrick et al. | ............ | 57/200 |
| 5,613,522 A | 3/1997 | Ford et al. | ............ | 138/123 |
| 6,050,077 A | 4/2000 | Muller | ............ | 57/210 |
| 6,337,115 B1 | 1/2002 | McMahon | ............ | 138/110 X |
| 6,341,626 B1 | 1/2002 | Davenport et al. | ............ | 138/110 |
| 6,367,583 B1 | 4/2002 | Derby | ............ | 182/3 |

OTHER PUBLICATIONS

Website pages of Petzl, Crolles, France (12 Pages) Showing the Petzl Protec Rope Protector products and other products.

* cited by examiner

*Primary Examiner*—Patrick F. Brinson
(74) *Attorney, Agent, or Firm*—Gauthier & Connors LLP (57) ABSTRACT

A protector is disclosed for protecting an elongated portion of a rope or webbing. The protector includes a flexible material including a first inner edge having a first length and about which the protector is wrapped such that a second outer edge is exposed. The first inner edge includes an elongated protector surface adjacent the first inner edge that is in continuous contact with a protected portion of the rope or webbing. The protected portion has a length that is substantially the same as the length of the protector.

18 Claims, 9 Drawing Sheets

ROPE AND WEBBING PROTECTOR

This application is a continuation-in-part application of U.S. Ser. No. 10/800,796 filed Mar. 15, 2004, which claims priority to U.S. Ser. No. 10/226,720 filed Aug. 23, 2002 and U.S. Ser. No. 10/326,530 filed Dec. 19, 2002, both of which claim priority to U.S. Provisional Application Ser. No. 60/352,637 filed Jan. 31, 2002.

BACKGROUND

The invention relates to ropes and webbing for use in a wide variety of applications, and particularly relates to devices for protecting such ropes and webbing during use.

Ropes and webbing are used for myriad applications, including for example, safety and rescue, military uses, aviation, boating, camping and climbing as well as wide variety of household uses. Although ropes and webbing are generally designed to bear a variety loads, it is well known that a rope is only as strong as its weakest area. If, for example, an area becomes contaminated by dirt and grit, abraded, or even frayed, the rope or webbing may become weakest in that area and may wear out more quickly. Both the contamination by dirt and grit as well as the abrasion result in a reduction in strength and reliability of the rope in the area of contamination and/or abrasion.

Frequent replacement of ropes and webbing is an effective but costly solution to this problem. Other options include the use of a material that becomes fixed to the rope or webbing, such as by shrink wrapping or clamping. Such materials, however, may not be easily moved or adjusted, and may not provide sufficient protection during use if the rope or webbing moves against an abrasive surface while carrying a load.

There is a need, therefore, for an improved protector for protecting ropes and webbing. There is a further need for a rope and webbing protector that is efficient and economical to produce and relatively easy to use.

SUMMARY OF THE INVENTION

The invention provides a protector for protecting an elongated portion of a rope or webbing. In accordance with an embodiment, the protector includes a flexible material including a first inner edge having a first length and about which the protector is wrapped such that a second outer edge is exposed. The first inner edge includes an elongated protector surface adjacent the first inner edge that is in continuous contact with a protected portion of the rope or webbing. The protected portion has a length that is substantially the same as the length of the protector.

In accordance with another embodiment, the protector includes a flexible material including a first inner edge having a first length and about which the protector is wrapped such that a second outer edge is exposed. The first inner edge includes an elongated protector surface adjacent said first inner edge that is in continuous contact with a protected portion of the rope or webbing. The protector further including securing means for securing the protector to the rope or webbing. In various further embodiments, the securing means may include a bend, a radius curve, a restriction or a flattening etc.

In accordance with a further embodiment, the protector includes an elongated flexible material that encloses a protected portion of the rope or webbing, and the flexible material is formed as a securing means for securing the protector to the rope or webbing. Again, in various further embodiments, the securing means may include a bend, a radius curve, a restriction or a flattening etc.

BRIEF DESCRIPTION OF THE DRAWINGS

The following description may be further understood with reference to the accompanying drawings in which.

The drawings are shown for illustrative purposes and are not to scale.

DETAILED DESCRIPTION OF THE ILLUSTRATED EMBODIMENTS

Figure 1:
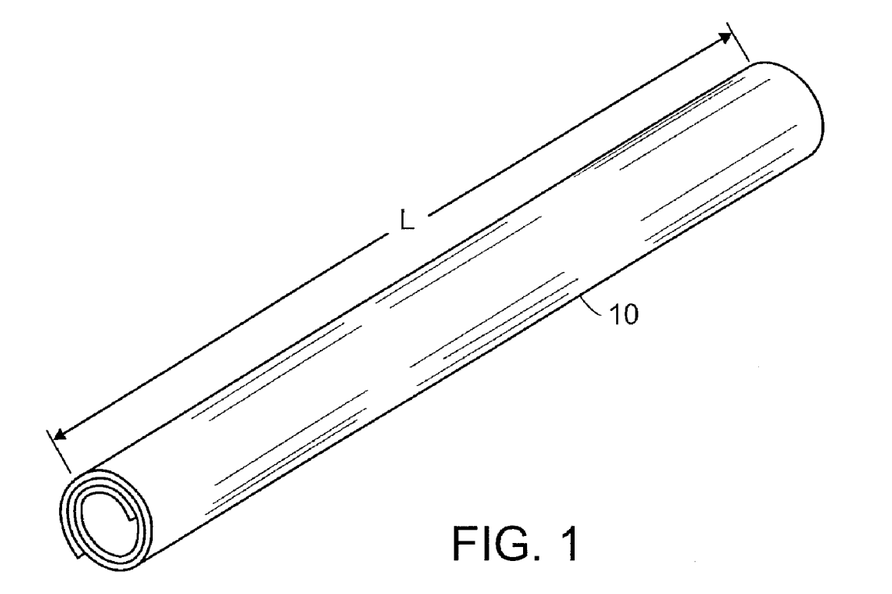
FIG. 1 shows an illustrative isometric view of a rope protector in accordance with an embodiment of the invention.
Figure 2:
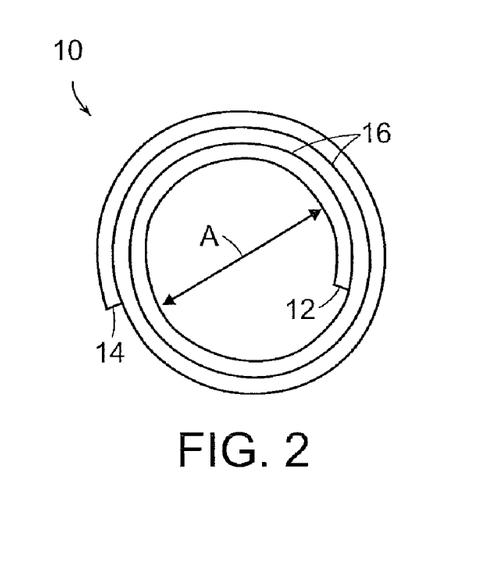
FIG. 2 shows an illustrative end view of the rope protector shown in FIG. 1.

As shown in FIG. 1, in accordance with an embodiment, the invention provides a protector 10 that is formed of a flexible material that is formed in a spiral position along its longitudinal direction L. The material may be heat settable, or may be formed by a variety of processes including molding or extrusion in various embodiments. The flexible material should be formed to have memory in the spiral shape (such as by heat setting) in accordance with an embodiment of the invention. The protector may be wrapped around a rope or webbing of various sizes and shapes with sufficient overlap that the rope or webbing will be protected from dirt, cutting, and abrasion over the length of the protector 10, especially when pulled or dragged over a sharp or rough surface. The material is formed or heat set to a diameter A as indicated in FIG. 2 such that the formed spiral material will have memory in the spiral position. The diameter A should be smaller than the ropes and webbings on which the protector will be used such that when wrapped around them it will fit snugly over the ropes and webs along the full length of the protector 10 with sufficient gripping force as to avoid slippage along the length of the rope or webbing. The features of protection and non-slippage are maintained even when the rope or webbing is bent or twisted and/or when dragged or rolled along a rough, hard surface. The device is easy to use, light weight, tight fitting, abrasion resistant, low in cost, and adaptable to ropes that may range in sizes from, for example, about 0.8 cm to about 2.5 cm in diameter and webbing that may vary from, for example, about 1 cm to about 3 cm in width.

In particular, as shown in FIG. 2, the protector 10 is formed by heat setting the flexible material in a spiral shape such that one elongated edge 12 is wrapped inside the spiral while the opposing elongated edge 14 is wrapped outside the spiral. As shown at 16 the material wraps around itself at least once, and may even wrap around itself about 2 to 2½ times as shown in FIG. 2.

The protector 10 may be formed of a urethane having a thickness of about 0.1 cm to about 0.2 cm, a width of about 5 cm to about 20 cm, and may have a length of about 35 cm to about 80 cm in accordance with various embodiments. The protectors should have a sufficient number of overlapping wraps such that when expanded over the largest size rope or webbing there will still exist sufficient overlap of the spiral to completely envelope and protect the rope of webbing even when they are severely bent and twisted. In further embodiments the protector may be formed of a wide variety of materials including without limitation, a variety of polymeric and/or elastomeric materials including rubber, neoprene or a silicon elastomer. The material should have excellent memory in certain embodiments such that when twisted, expanded, or distorted it will substantially, if not completely, return to its original configuration when left in a free state. When wrapped around a rope or webbing larger in size than its free inside diameter, the spiral will try to return to its original inside diameter and in the process wrap snugly on the rope or webbing with sufficient force along its entire length as to preclude slippage along the length of the rope or webbing and to resist being unwrapped when slid sideways along a rough, hard surface in a direction transverse to the length of the spiral part.

Figure 3:
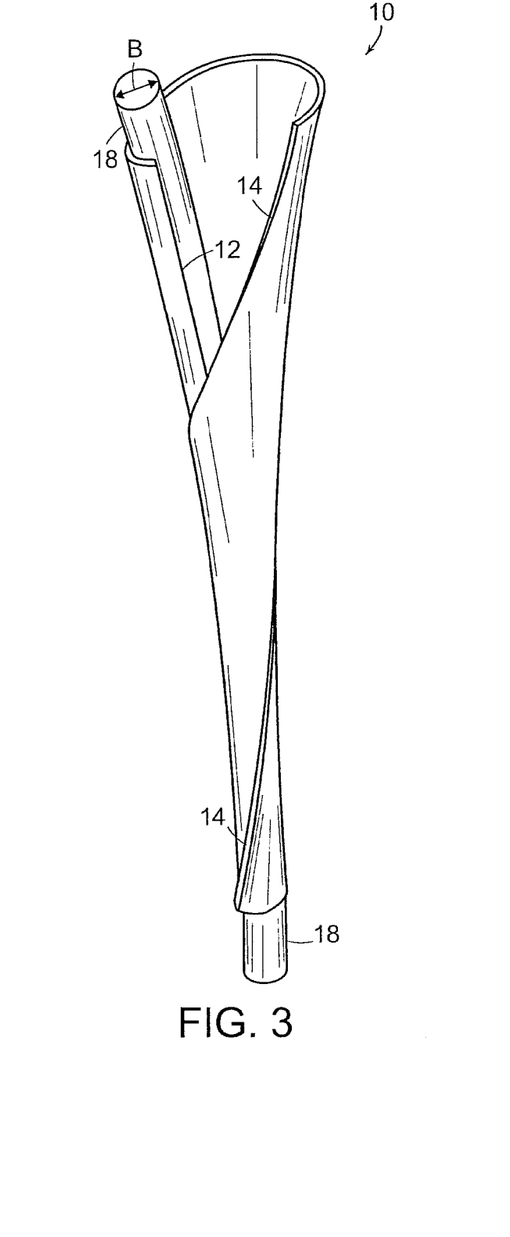
FIG. 3 shows an illustrative isometric view of the rope protector shown in FIG. 1 being wrapped around a rope.
Figure 4:
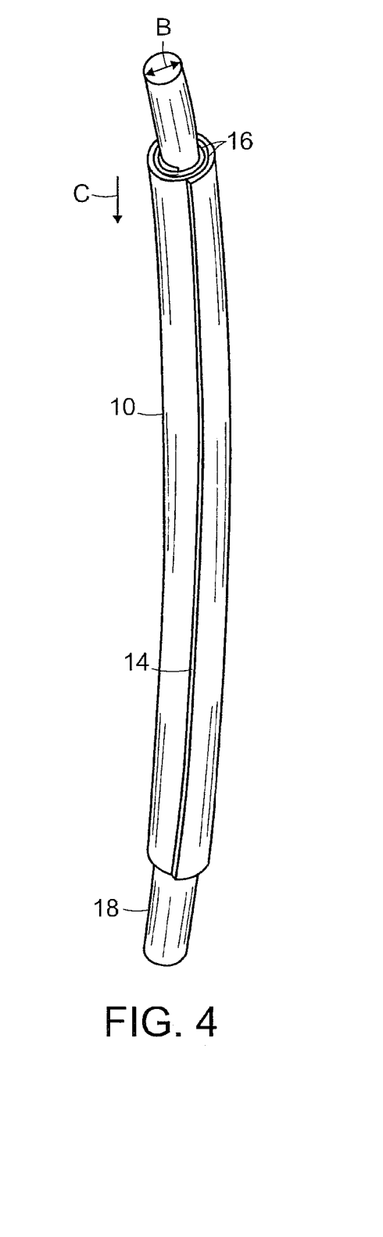
FIG. 4 shows an illustrative isometric view of the rope and rope protector shown in FIG. 3 with the rope protector fully wrapped around the rope.

For example, as shown in FIGS. 3 and 4, the protector may be wrapped around a rope 18 having a diameter B that is at least as large as the free diameter A of the protector. Even if the outer edge of the spiral is forced open by the sliding actions, there is sufficient redundant overlap within the spiral to provide full coverage of the rope or webbing. Assembly of the protector 10 onto the rope 18 requires the spiral protector 10 to be opened up as shown in FIG. 3. While holding edge 12 against the rope 18, edge 14 is brought over edge 12 and rotated over edge 12 and around rope 18 until it is fully wound over its length L as shown in FIG. 4. At this point, the elastic memory of the material used to construct the protector 10 will cause it to contract evenly around the rope 18 as shown in FIG. 4. The rope diameter B is larger than the original inside diameter A of the protector 10 thus preventing the protector 10 from returning to its original size. The protector 10 will fit snugly onto the rope 18 with a small constricting force around its entire inside diameter and along its entire length. As a result of this force the protector 10 will hold itself in place on the rope 18 and not slide along the rope 18 unless pushed with a force as indicated at C in FIG. 4. Typically, force C might result from a person's fingers pushing the protector 10 lengthwise along the rope 18 to whatever location is desired. It should be pointed out that the protector 10 may be wrapped around rope 18 in reverse with the edge 14 against the rope 18 and edge 12 on the outside. However, the constricting force previously described will be slightly diminished.

Figure 5:
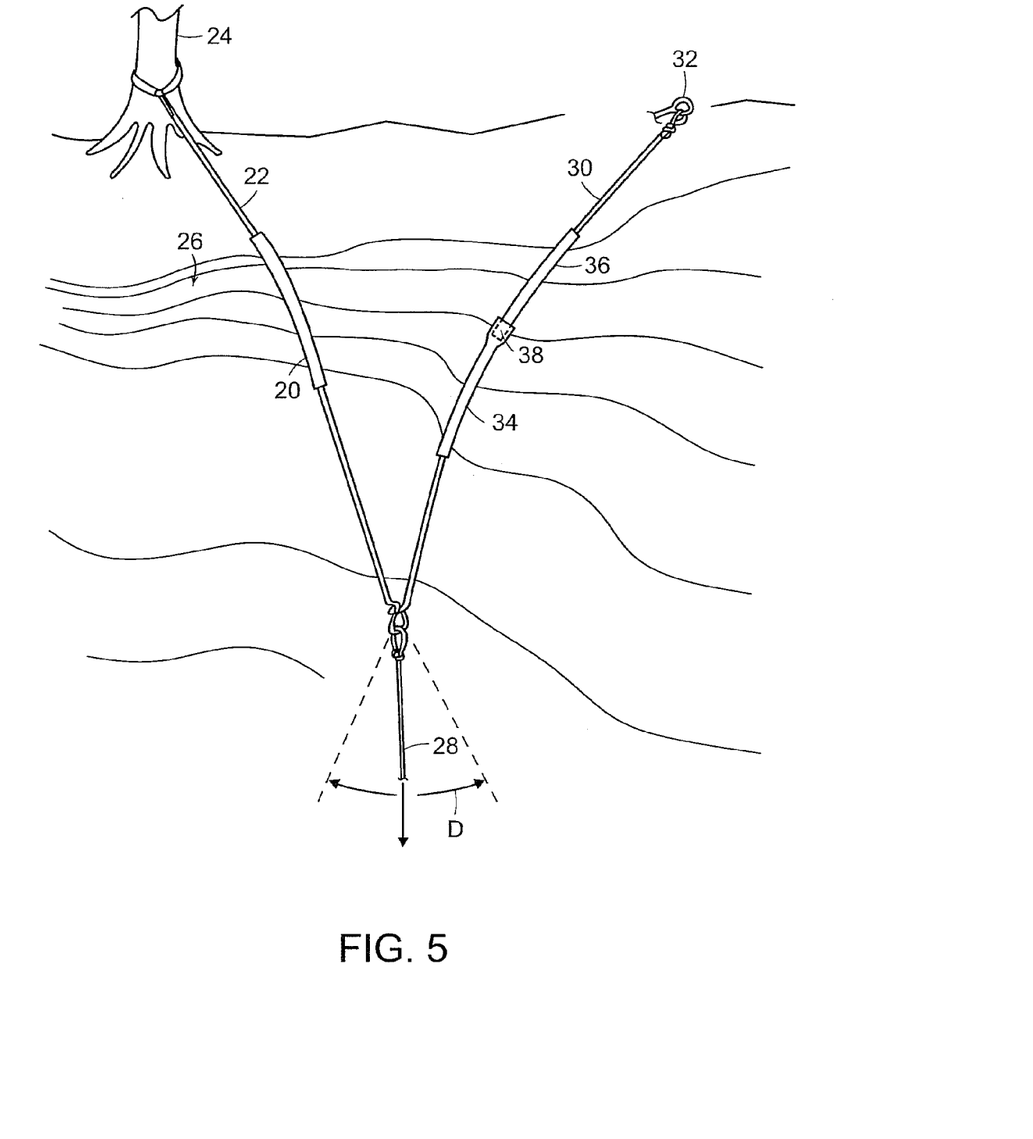
FIG. 5 shows an illustrative isometric view of rope protectors in accordance with various embodiments of the invention being used on top ropes at a rock climbing site.

There may exist such a high degree of friction between the protector and the external environment that the device will allow for natural stretching and/or sliding of a weighted rope/webbing through the center of the protector, yet still remain stationary with respect to the external lying surface. For example, as shown in FIG. 5, a first protector 20 may be applied to a rope 22 that is itself secured to a tree 24 at the top of a climbing wall 26. The rope 22 may be permitted to stretch or move slightly within the protector 20 if the friction between the outer surface of the protector 20 exceeds the friction between the rope 22 and the inside surface of the protector 20. The rope 22 may be used to support a climbing safety rope 28 together with a backup rope 30 that is attached to an anchor 32 as shown. The rope 30 may also include one or more protectors 34 and 36, particularly if the area to be covered at the top edge of the climbing wall requires more protector length as shown. In particular, the protectors may be placed in tandem with any number of additional protectors with slight end to end overlap (as shown at 38) for situations requiring protection of a length of rope/webbing greater than what a single protector could cover.

Figure 6:
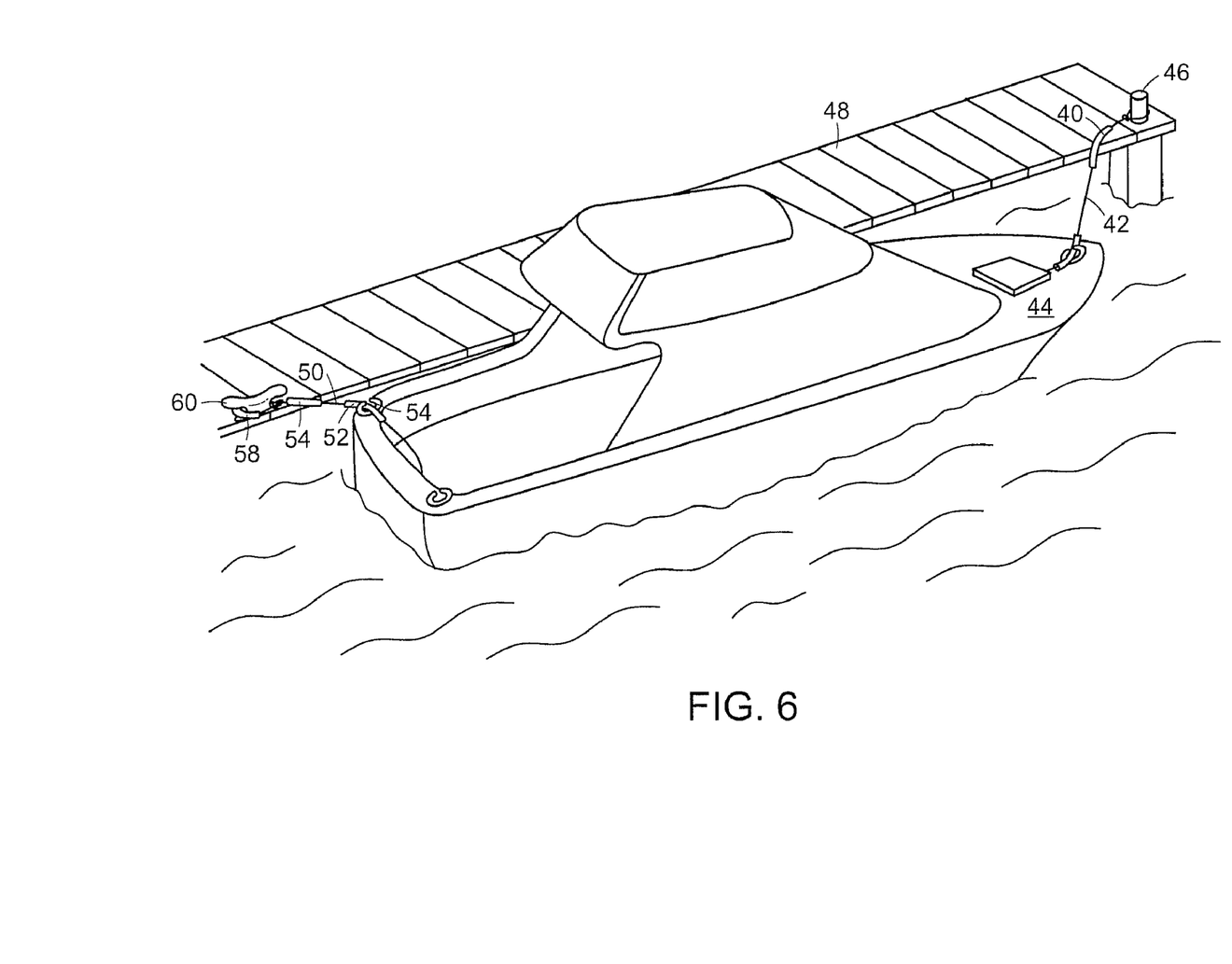
FIG. 6 shows an illustrative isometric view of protectors in accordance with various embodiments of the invention being used in a marine application.
Figure 7:
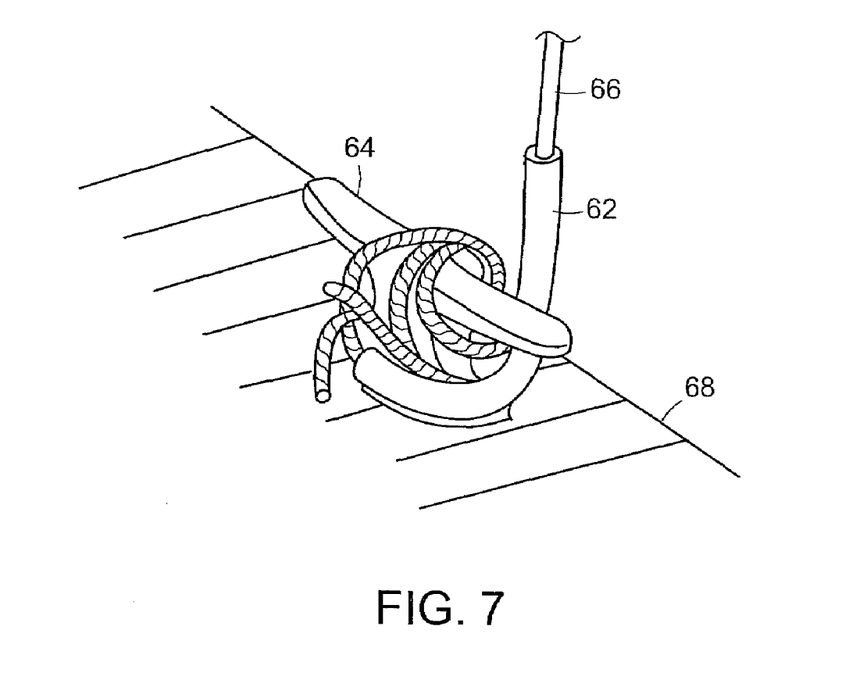
FIG. 7 shows an illustrative isometric view of a rope protector in accordance with a further embodiment used in a marine application.
Figure 8:
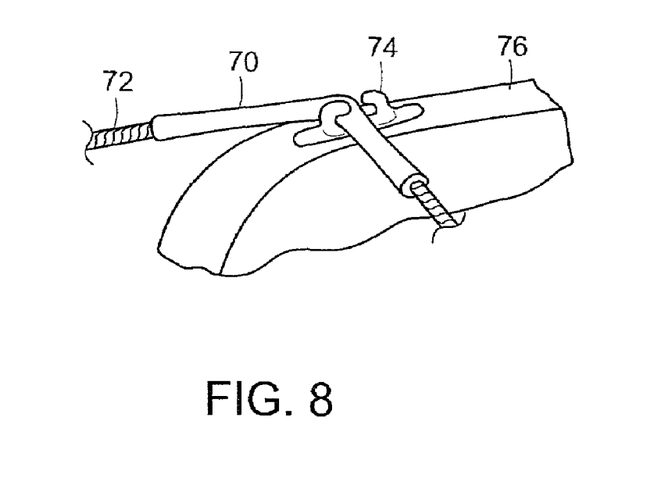
FIG. 8 shows an illustrative isometric view of another rope protector in accordance with another embodiment used in a marine application.

In further embodiments, a protector of the invention may be used in marine applications. For example, the protector shown in FIGS. 3 and 4 may be wrapped around a dock line having a diameter B that is at least as large as the free diameter A of the protector as shown in FIGS. 6-8. Even if the outer edge of the spiral is forced open by a sliding action, there is sufficient and redundant overlap within the spiral to provide full coverage of the rope or webbing. Assembly of the protector onto the line may be achieved as discussed above with reference to FIGS. 3 and 4.

In particular, as shown in FIG. 6, a first protector 40 may be applied to a first dock line 42 that is itself secured between a boat 44 and a first dock cleat 46 on a dock 48. The line 42 may be permitted to stretch or move slightly within the protector 40 if the friction between the outer surface of the protector 40 exceeds the friction between the line 42 and the inside surface of the protector 40. A second dock line 50 may be used together with a second protector 52 (adjacent the deck cleat 54 on the boat), a third protector 56 (adjacent the edge of the dock 58), and a fourth protector 58 (adjacent a second dock cleat 60). In further embodiments, protectors may be used end to end on a single line or sheet, and may overlap one another at their ends, or be used in mooring lines away from a dock.

The protectors are preferably used at locations on ropes where the rope is subjected to concentrated forces over dirty and/or abrasive surfaces such as at the edge of a cleat or dock. As shown in FIG. 7, a protector 62 may be wrapped around a dock cleat 64 such that the protector 62 protects the line 66 against abrasion with respect to the cleat 64 itself as well as the dock 68. As shown in FIG. 8, a protector 70 may be wrapped around a sheet 72 such that the protector 70 protects the sheet 72 against abrasion with respect to a sheet cleat 74 on a boat 76.

Figure 9:
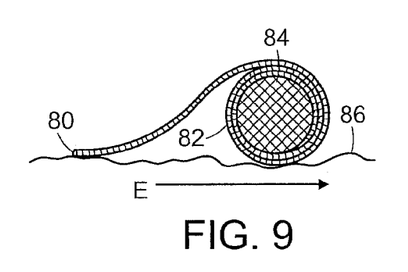
FIG. 9 shows an illustrative sectional view of a rope including an attached rope protector of another embodiment of the invention during use and being subjected to a drag in a direction transverse to the longitudinal direction of the rope.

The lines and sheets that may be protected by the protectors therefore, are those that must withstand abuse such as from abrasion under hostile conditions, e.g., cold weather and salt air/water. If the line or sheet is swung thru an arc adjacent a rough edge, the protector along with enclosed line or sheet may be dragged sideways along rough edge resulting in the protector being subjected to dirt and abrasion while the enclosed lines are fully protected. In particular, the dragging action may cause an outside edge 80 of the a protector 82 to be pulled out and away from the spiral of the protector 82 when dragged in a direction as indicated at D in FIG. 9. There are sufficient overlapping turns in the protector 82 to keep the line or sheet 84 fully covered and protected from the abrasive edge 86 as shown in FIG. 9.

In certain applications where the protectors are applied to a line for an extended period of time, such as for use with mooring lines, the protector may further be attached to the line by use of a plastic locking tie-wrap or marine adhesive tape.

The protectors are preferably used at locations on ropes where the rope is subjected to concentrated forces and/or over dirty or abrasive surfaces. The protector may be wrapped around the rope at one location away from area of interest (e.g., the edge of a rock ledge or a building) and then slid via force C (as shown in FIG. 4) along the rope to an area of interest. A downward force from a load (such as from a rock climber hanging on a rope) typically causes the most concentrated and destructive forces at an area of interest. The ropes, however, are protected by the protectors that are designed to withstand such abuse in accordance with various embodiments.

Figure 10:
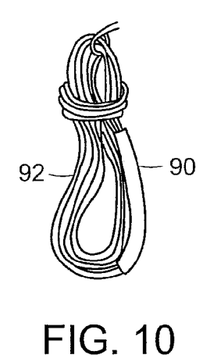
FIG. 10 shows an illustrative side view of a coil of rope including a rope protector of another embodiment of the invention.

Other desirable features include a weight of preferably less than 2.5 ounces and flexibility for packing, both of which are important in certain applications, such as backpacking or hauling supplies and equipment long distances. After use, the one or more protectors 90 may be left on the rope 92 when it is coiled up or stuffed in a bag or backpack as shown in FIG. 10. In further embodiments, the protector may have a weight of less than about 5 ounces.

Figure 11:
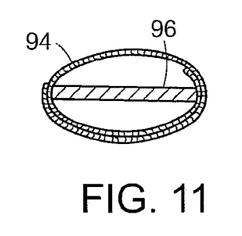
FIG. 11 shows an illustrative sectional view of a protector of another embodiment of the invention used to protect webbing.
Figure 12:
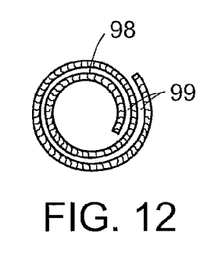
FIG. 12 shows an illustrative sectional view of a protector of another embodiment of the invention.
Figure 13A:
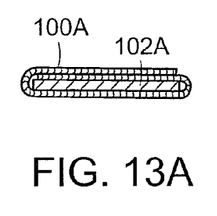
FIGS. 13A-13C show illustrative sectional views of protectors in accordance with further embodiments of the invention.
Figure 13B:
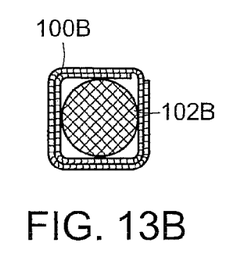
Figure 13C:
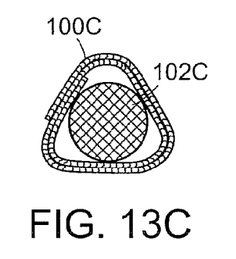
Figure 14:
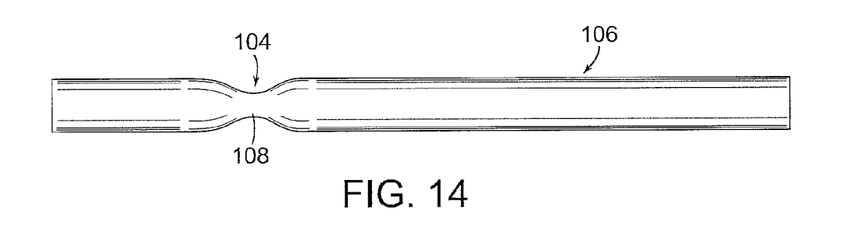
FIG. 14 shows an illustrative side view of a rope protector of another embodiment of the invention wherein the diameter is reduced at one location.

A protector 94 may also be used to protect webbing 96 as shown in FIG. 11. In other embodiments, a spiral protector 98 of an embodiment of the invention need not be tight but may be loose with a small continuous gap 99 between the overlapping spiral segments as shown in FIG. 12. This may be the case if the protector is produced via an extrusion process. The protector then may or may not be reversed when coiled around a rope or webbing. In further embodiments, the spiral protector may be configured in a variety of cross sectional shapes (e.g., 100A, 100B, 100C) including squares and rectangles as shown in FIGS. 10A-10C for protecting rope and webbing (102A, 102B, 102C respectively). The rectangular shape 100A may be of particular interest for use with webbing 102A.

Figure 15:
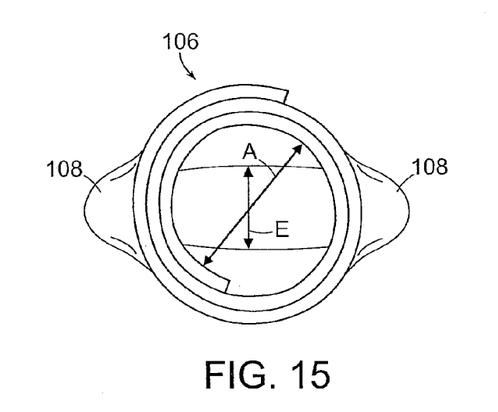
FIG. 15 is an illustrative end view of the rope protector shown in FIG. 14.

In certain applications, it may be desirable to provide a rope protector for a rope having a diameter that is smaller than the inner diameter of the rope protector. To avoid the manufacturing problems and costs involved in making very small diameter rope protectors, the cross section of the rope protectors previously described may be compressed (e.g., by heat setting) into an elliptical type configuration in one or more localized places 104 providing a reduced thickness in one dimension as shown at E in FIG. 15 while the thickness of the protector 106 in an orthogonal direction between points of expansion 108 is enlarged. The reduced thickness E may be smaller than the inner diameter A of the rope protector, permitting the rope protector to be used on a rope of diameter of at least E without slipped along the rope.

Figure 16:
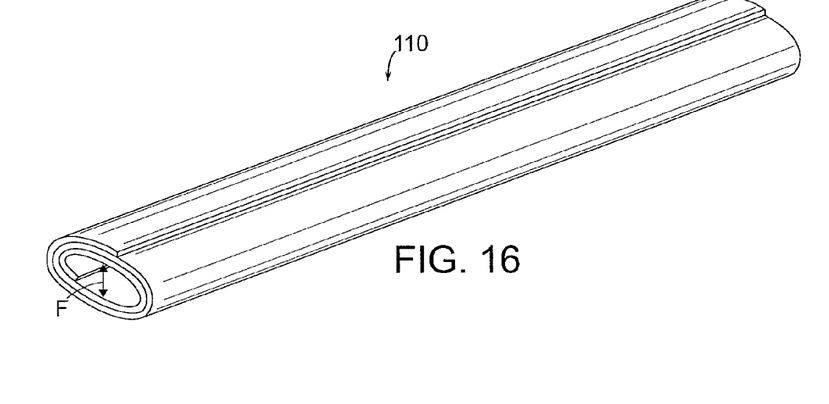
FIG. 16 is an illustrative isometric view of a rope protector of an embodiment of the invention wherein the rope protector is flattened to a reduced width over its entire length.

As shown in FIG. 16, a rope protector 110 may be flattened (e.g., by heat setting) along its entire length to a thickness F to provide a reduced thickness F that may be smaller than the diameter of a rope, permitting the protector 110 to be used on ropes having a thickness of at least F.

Figure 17:
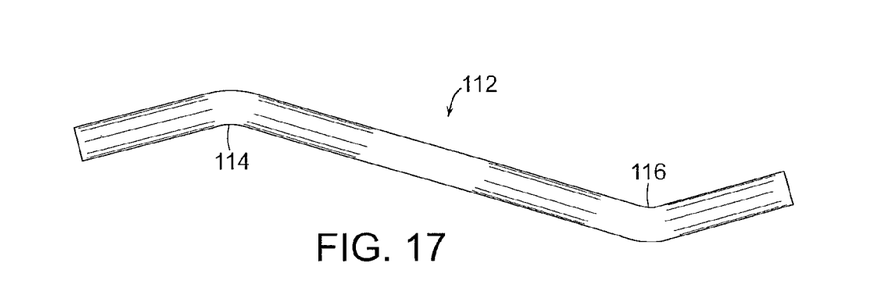
FIG. 17 is an illustrative side view of a rope protector of another embodiment of the invention with sharp bends in the rope protector.

In a further embodiment, a rope protector 112 may include a plurality of sharp heat set bends at locations 114 and 116 as shown on opposite sides of the protector 112. The natural stiffness of the rope and rope protector will force the rope against the inside of the rope protector at locations 114 and 116 as the rope and rope protector are forced to conform to each other thus producing sufficient friction to hold the rope protector in place even if the rope is smaller than the smallest diameter of the protector. Therefore, although the bend alone may not reduce the inner smallest dimension of the protector 112, the degree of the bends and/or the placement of the bends may provide sufficient overall friction between the protector and the rope to maintain the protector in its place on the rope unless it is moved through the application of force such as by a person.

Figure 18:
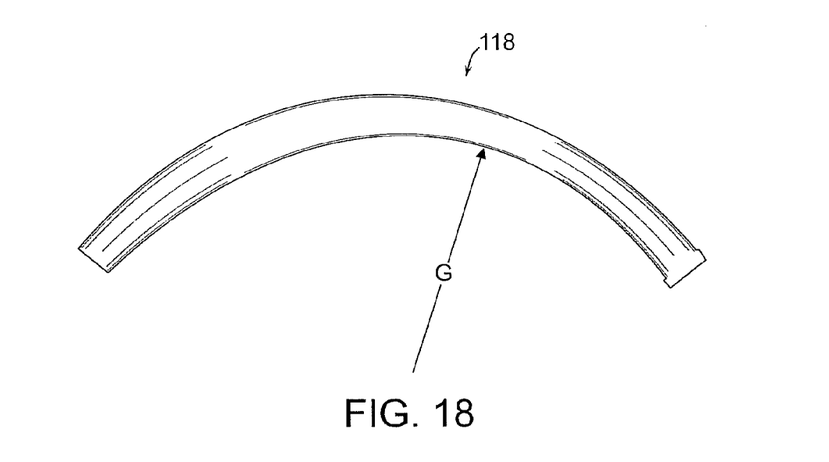
FIG. 18 is an illustrative side view of a rope protector of another embodiment of the invention formed into a curve.

Similarly, the protector 118 shown in FIG. 18 may be formed into a curved shape having a radius G. Again, the degree of the radius may provide sufficient overall friction between the protector and the rope to maintain the protector in its place on the rope unless it is moved through the application of force such as by a person.

Figure 19:
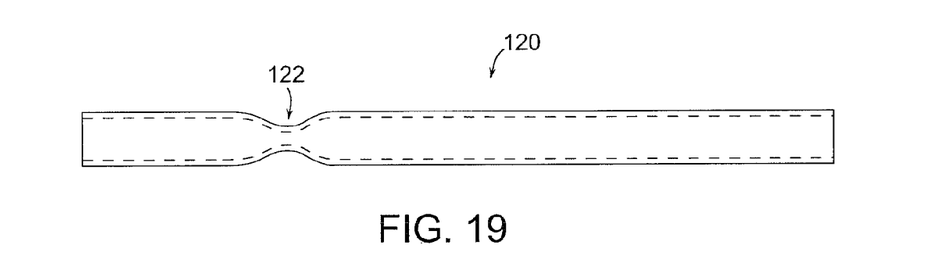
FIG. 19 is an illustrative side view of a rope protector of an embodiment where the protector is a round tube with the diameter reduced at one location.
Figure 20:
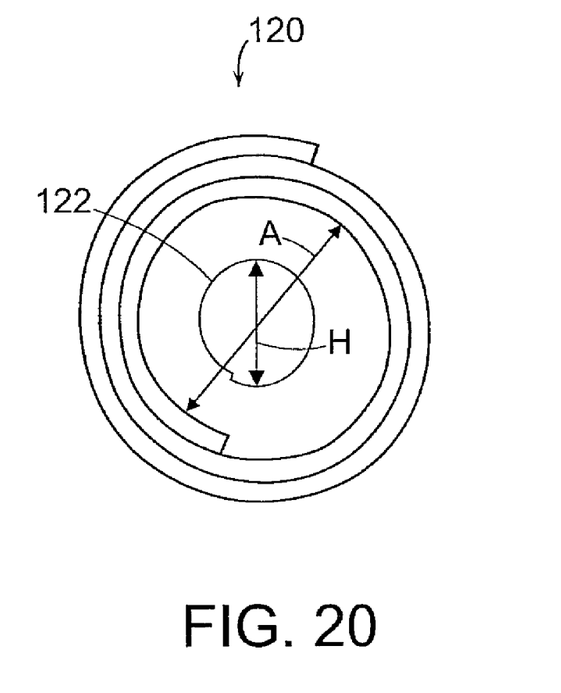
FIG. 20 is an illustrative end view of the rope protector shown in FIG. 19.

As shown in FIGS. 19 and 20, in accordance with a further embodiment, a protector 120 may include an area 122 in which the inner radius of the protector 122 is reduced from A to H, permitting the protector 120 to be used on ropes having a thickness of at least H.

Protectors of the invention may be used for a wide variety of uses including safety and rescue, military applications, aviation, boating, camping and climbing as well as wide variety of household uses. Those skilled in the art will appreciate that numerous modifications and variations may be made to the above disclosed embodiments without departing from the spirit and scope of the invention.

What is claimed is:

1. A protector for protecting a protected elongated portion of a rope or webbing, said protector including a protector length along an elongated length of said protector, and said protected elongated portion of the rope or webbing including a protected length that is substantially the same as the protector length, said protector including a flexible abrasion resistant material that comprises:

an inner surface adjacent an inner elongated edge of said protector that contacts said protected elongated portion of the rope or webbing along substantially the full length of the protected length of the elongated portion of the rope or webbing;

an outer abrasion resistant surface adjacent an outer exposed edge of said protector along substantially the full length of the protected length of the elongated portion of the rope or webbing, said outer abrasion resistant surface providing abrasion resistance and protection of the rope or webbing to external abrasive elements;

an intermediate abrasion resistant surface that is intermediate said inner surface and said outer abrasion resistant surface and is not adjacent said inner surface, said intermediate surface extending along substantially the full length of the protected length of the elongated portion of the rope or webbing, and said intermediate abrasion resistant surface providing abrasion resistance and protection of the rope or webbing in the event that a portion of said intermediate abrasion resistant surface becomes exposed due to movement of a portion of said outer abrasion resistant surface away from the rope or webbing; and securing means for securing said protector to the rope or webbing, said securing means including at least one flattened region in said protector.

2. The protector as claimed in claim 1, wherein said securing means further includes the inner radial force applied by the protector against the rope or webbing such that the inner protector rest diameter is smaller than the outer rope or webbing diameter.

3. The protector as claimed in claim 2, wherein said securing means is sufficient to maintain the protector in place on the rope or webbing, yet permits the rope or webbing to move relative the protector when the protector is in contact with an abrasive surface.

4. The protector as claimed in claim 1, wherein said securing means further includes at least one bend in said protector.

5. The protector as claimed in claim 1, wherein said securing means further includes a curve formed in said protector such that at least a portion of said protector is formed into a curve.

6. The protector as claimed in claim 1, wherein said flattened region extends along an entire length of said protector.

7. The protector as claimed in claim 1, wherein said securing means further includes a restriction in an inner diameter of at least a restricted portion of said protector.

8. The protector as claimed in claim 7, wherein said restriction encircles the rope or webbing in the restricted portion of said protector.

9. A protector for protecting a protected elongated portion of a rope or webbing, said protector including a protector length along an elongated length of said protector, and said protected elongated portion of the rope or webbing including a protected length that is substantially the same as the protector length, said protector including a flexible abrasion resistant material that comprises:

an inner surface adjacent an inner elongated edge of said protector that contacts said protected elongated portion of the rope or webbing along substantially the full length of the protected length of the elongated portion of the rope or webbing;

an outer abrasion resistant surface adjacent an outer exposed edge of said protector along substantially the full length of the protected length of the elongated portion of the rope or webbing, said outer abrasion resistant surface providing abrasion resistance and protection of the rope or webbing to external abrasive elements;

an intermediate abrasion resistant surface that is intermediate said inner surface and said outer abrasion resistant surface and is not adjacent said inner surface, said intermediate surface extending along substantially the full length of the protected length of the elongated portion of the rope or webbing, and said intermediate abrasion resistant surface providing abrasion resistance and protection of the rope or webbing in the event that a portion of said intermediate abrasion resistant surface becomes exposed due to movement of a portion of said outer abrasion resistant surface away from the rope or webbing; and localized securing means for securing said protector to the rope or webbing in an area of the protected length of the rope or webbing that is smaller than the full protected length of the rope or webbing, said securing means including a restriction in an inner diameter of at least a restricted portion of said protector.

10. The protector as claimed in claim 9, wherein said securing means includes at least two distinct areas of the protected length of the rope or webbing that together are smaller than the full protected length of the rope or webbing.

11. The protector as claimed in claim 9, wherein said securing means is sufficient to maintain the protector in place on the rope or webbing, yet permits the rope or webbing to move relative the protector when the protector is in contact with an abrasive surface.

12. The protector as claimed in claim 9, wherein said securing means further includes at least one bend in said protector.

13. The protector as claimed in claim 9, wherein said securing means further includes a curve formed in said protector such that at least a portion of said protector is formed into a curve.

14. The protector as claimed in claim 9, wherein said securing means further includes at least one flattened region in said protector.

15. The protector as claimed in claim 9, wherein said restriction encircles the rope or webbing in the restricted portion of said protector.

16. A method of protecting a protected elongated length of a rope or webbing, said method comprising the steps of:

providing a flexible, abrasion resistant protector including a protector length along an elongated length of said protector, and said protector length being substantially the same as the protected elongated length of the rope or webbing applying an inner surface adjacent an inner elongated edge of said protector to the protected elongated length of the rope or webbing along substantially the full length of the protected length of the elongated portion of the rope or webbing;

wrapping said protector around the protected length of the elongated portion of the rope or webbing such that an outer abrasion resistant surface adjacent an outer exposed edge of said protector becomes exposed along substantially the full length of the protected length of the elongated portion of the rope or webbing, said outer abrasion resistant surface providing abrasion resistance and protection of the rope or webbing to external abrasive elements;

providing an intermediate abrasion resistant surface intermediate said inner surface and said outer abrasion resistant surface, said intermediate abrasion resistant surface extending along substantially the full length of the protected length of the elongated portion of the rope or webbing, said intermediate abrasion resistant surface providing abrasion resistance and protection of the rope or webbing in the event that a portion of said intermediate abrasion resistant surface becomes exposed due to movement of a portion of said outer abrasion resistant surface away from the rope or webbing in an area of the protected length of rope or webbing that is smaller than the full protected length of the rope or webbing; and securing said protector to the rope or webbing by providing said protector with a restriction in an inner diameter of at least a restricted portion of said protector.

17. A method as claimed in claim 16, wherein said step of securing the protector to the rope or webbing is further achieved through application of an inner radial force applied by the protector against the rope or webbing due to the inner protector rest diameter being smaller than the outer rope or webbing diameter.

18. A method as claimed in claim 16, wherein said step of securing the protector to the rope or webbing provides sufficient securing to maintain the protector in place on the rope of webbing, yet permits the rope or webbing to move relative the protector when the protector is in contact with an abrasive surface.

* * * * *

UNITED STATES PATENT AND TRADEMARK OFFICE
CERTIFICATE OF CORRECTION

| | | |
|---|---|---|
| PATENT NO. | : 7,325,575 B1 | Page 1 of 1 |
| APPLICATION NO. | : 10/913593 | |
| DATED | : February 5, 2008 | |
| INVENTOR(S) | : Mark G. O'Donnell and Miles C. O'Donnell | |

It is certified that error appears in the above-identified patent and that said Letters Patent is hereby corrected as shown below:

item 56
On the title page, under Related U.S. Application Data, after "Continuation-in-part of application No. 10/800,796, filed on Mar. 15, 2004" please add:

--, which claims priority to application No. 10/226,720 filed Aug. 23, 2002 and application No. 10/326,530 filed Dec. 19, 2002, both of which claim priority to application No. 60/352,637 filed Jan. 31, 2002--

Signed and Sealed this

Twenty-fourth Day of June, 2008

JON W. DUDAS
*Director of the United States Patent and Trademark Office*